United States Patent

Durr

[15] 3,678,824

[45] July 25, 1972

[54] PHOTOGRAPHIC APPARATUS WITH INDICATING MEANS FOR SELECTED EXPOSURE TIME AND APERTURE SIZE

[72] Inventor: Helmut Durr, Karneidplatz 12, Munich, Germany

[22] Filed: Dec. 22, 1970

[21] Appl. No.: 100,674

[30] Foreign Application Priority Data

Dec. 23, 1969 Germany ....................P 19 64 689.0

[52] U.S. Cl. ............................................95/10 CE, 95/53 E

[51] Int. Cl. ............................................G01j 1/44

[58] Field of Search .................95/53 R, 53 E, 53 EA, 53 EB, 95/10 C, 10 CE, 10 CT, 10 CD

[56] References Cited

UNITED STATES PATENTS

| | | | |
|---|---|---|---|
| 2,351,978 | 6/1944 | Kuppenbender | 95/10 C |
| 1,213,485 | 1/1917 | Herz | 95/53 R |
| 3,545,870 | 12/1970 | Burgarella | 95/10 C |
| 3,547,016 | 12/1970 | Rentschler | 95/53 EB |
| 2,573,729 | 11/1951 | Rath | 95/10 CT |
| 2,874,622 | 2/1959 | Gebele | 95/10 C |
| 2,521,093 | 9/1950 | Rath | 91/10 C |
| 3,385,185 | 5/1968 | Schulze | 95/10 C |
| 3,460,450 | 8/1969 | Ogihara | 95/10 CT |

*Primary Examiner*—Samuel S. Matthews
*Assistant Examiner*—Monroe H. Hayes

[57] ABSTRACT

A camera wherein a setting ring is rotatable by hand to select a desired aperture size and simultaneously moves a pointer with reference to an *f*-stop scale. An exposure time scale is movable along the *f*-stop scale together with a filter which influences the admission of light to a photoelectric receiver in an exposure time selecting circuit which causes a lamp to light up when the exposure time is too long for the making of exposures with the camera held by hand. The filter is also moved in response to rotation of the setting ring to thus influence the selection of exposure time as a function of the selected aperture size. If the user wishes to determine that exposure time which is automatically selected in response to selection of a particular aperture size, the exposure time scale is moved with the filter until the lamp lights up. The graduations of the exposure time scale then register with appropriate graduations of the *f*-stop scale and the user can look through the view-finder window to see that graduation of the exposure time scale which registers with the graduation representing the selected aperture size.

14 Claims, 3 Drawing Figures

16A 16 16B 16a 17 17a 18 19 20 21 22 14 15 23 13 24 2 3 4 9 1 8 7 6A 1a 6 6b 6a D 5 5a 10 11 12
1/500 1/250 1/125 1/60 1/30 2,8 4 5,6 8 11 16 22

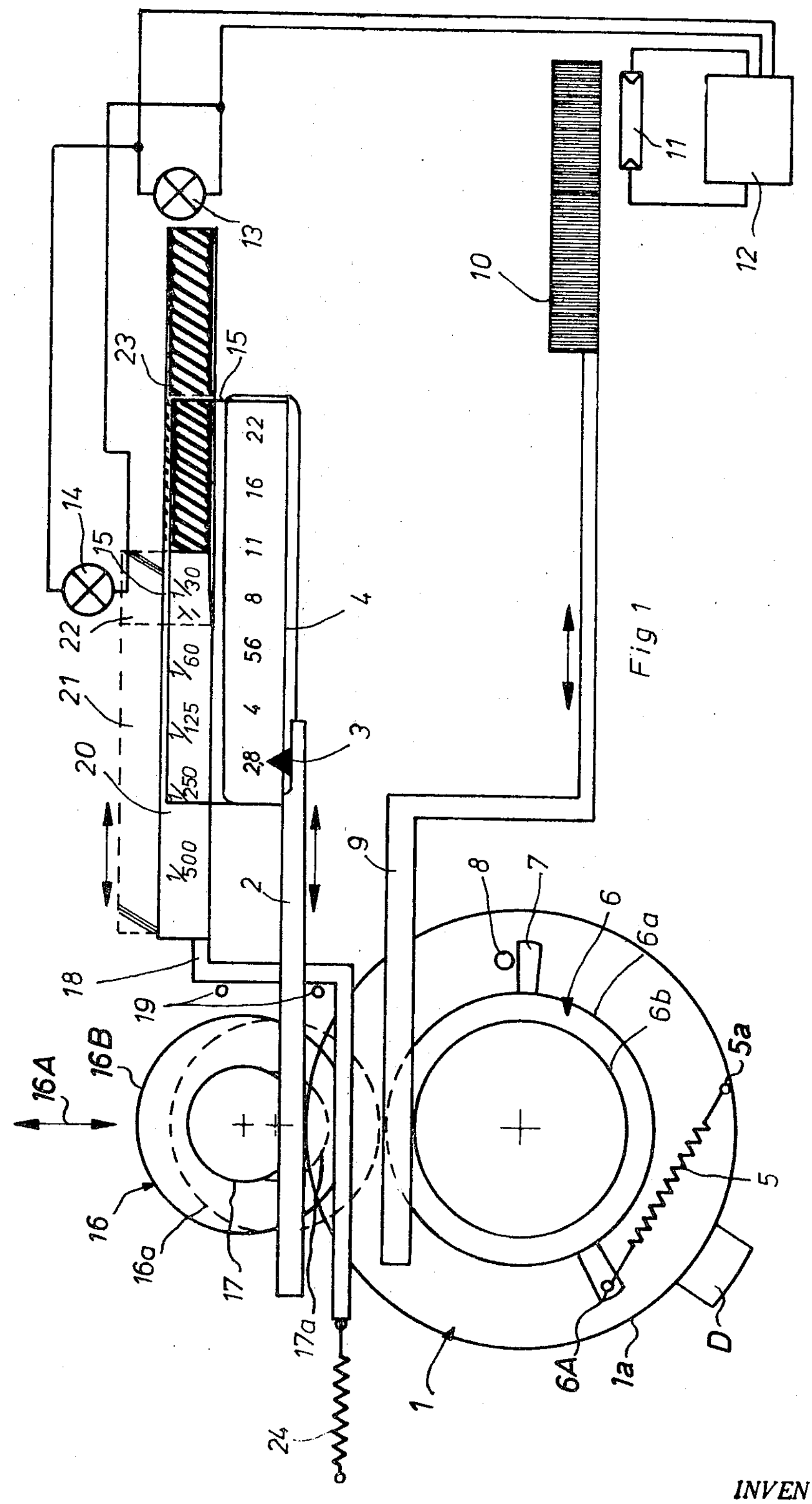
INVENTOR
HELMUT DÜRR
BY [signature] Attorney

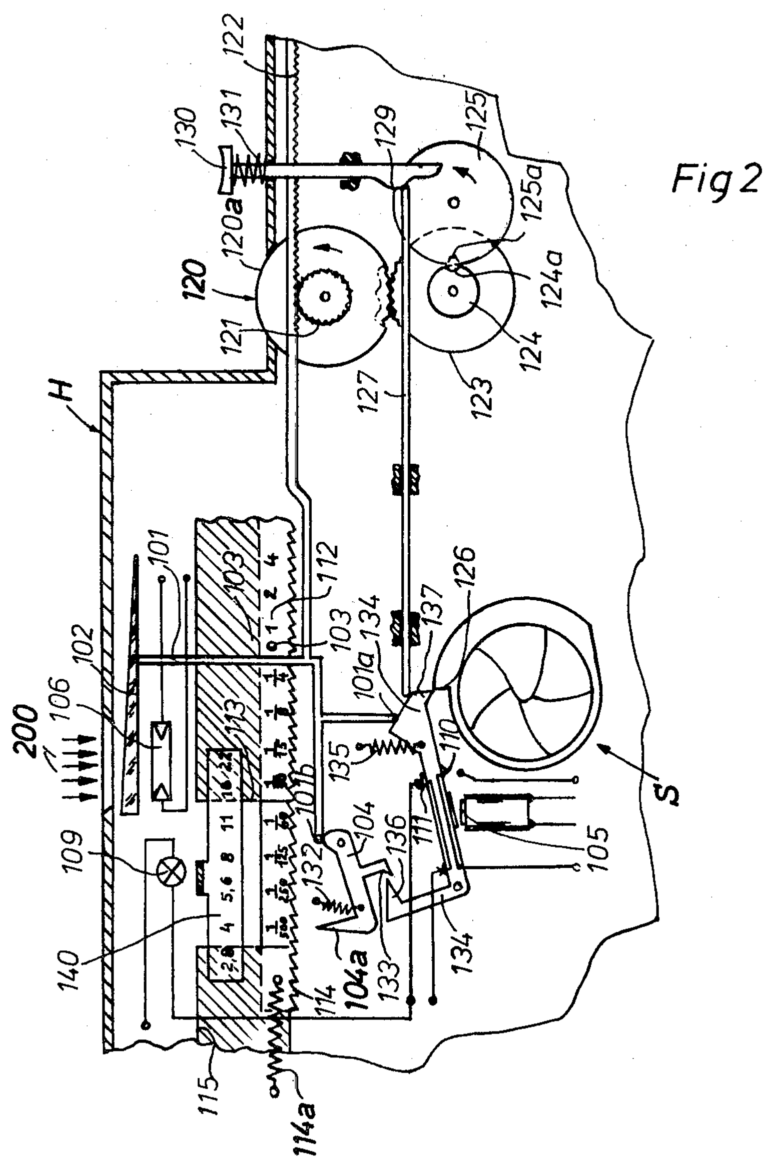
INVENTOR
HELMUT DÜRR
BY

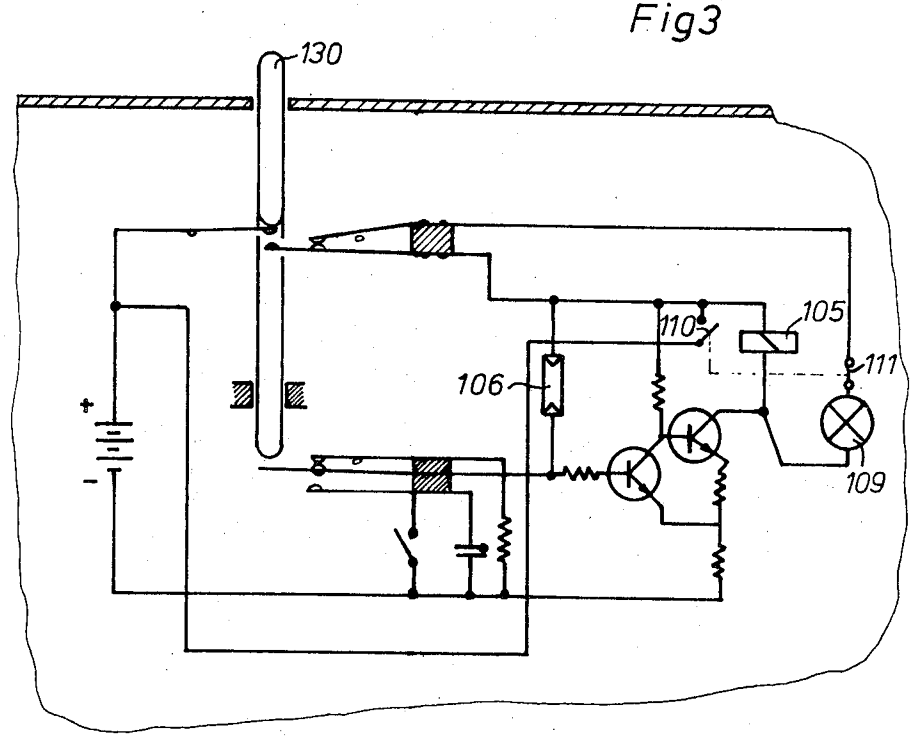
INVENTOR
HELMUT DÜRR
BY [signature]
Attorney

PHOTOGRAPHIC APPARATUS WITH INDICATING MEANS FOR SELECTED EXPOSURE TIME AND APERTURE SIZE

BACKGROUND OF THE INVENTION

The present invention relates to photographic apparatus in general, and more particularly to improvements in exposure controls for photographic cameras. Still more particularly, the invention relates to improvements in exposure control assemblies of the type wherein the exposure time is determined as a function of scene brightness and can be influenced by the mechanism which selects the aperture size, and which embody means for indicating those exposure values which are not satisfactory for the making of exposures with the camera held by hand.

SUMMARY OF THE INVENTION

An object of the invention is to provide a photographic apparatus with a semiautomatic exposure control assembly wherein one exposure value (for example, the exposure time) is set as a function of the other exposure value (e.g., the aperture size) and wherein the user of the camera can determine that exposure time which is automatically selected by the exposure control in response to selection of a particular aperture size, or vice versa.

Another object of the invention is to provide the photographic apparatus with novel and improved means for indicating the exposure values which can be selected by the exposure control assembly.

A further object of the invention is to provide a photographic apparatus with means which enables the user to determine all such exposure times which are satisfactory for the making of exposures at a particular scene brightness with different aperture sizes, or vice versa.

An additional object of the invention is to provide the photographic apparatus with indicating means for indicating satisfactory combinations of exposure time and aperture size and to construct and mount the indicating means in such a way that it can be observed in the viewfinder of the apparatus.

An anciallary object of the invention is to provide a photographic apparatus with an exposure control assembly having novel means for selecting the aperture size and/or the exposure time.

The invention is embodied in an exposure control assembly which is to be used in photographic apparatus and comprises a first scale having graduations representing various aperture sizes (f-stops), preferably ring-shaped movable diaphragm setting means which can adjust the diaphragm to select one of several aperture sizes, an index, pointer or analogous first indicating means movable in response to movement of the setting means to pinpoint on the first scale that graduation which represents the selected aperture size, an adjustable exposure time selecting circuit for selecting exposure times as a function of several factors one of which is the scene brightness, a grey filter or analogous regulating means for adjusting the circuit as a function of the position of the setting means so that the exposure times which are selected by the circuit are influenced by the aperture sizes selected by the setting means, a lamp or analogous second indicating means controlled by the circuit and operative to produce indications in response to selection of one or more predetermined exposure times (preferably those exposure times which are too long for the making of exposures with the camera housing held by hand), a second scale which is movable along the first scale and is provided with graduations representing various exposure times, and rotary or reciprocable displacing means for moving the regulating means in synchronism with the second scale so that the two scales maintain in registry proper combinations of respective graduations when the regulating means causes the circuit to operate the second indicating means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic view of a portion of a photographic apparatus having an exposure control assembly which embodies one form of the invention;

FIG. 2 is a diagrammatic view of a portion of a second photographic apparatus having a modified exposure control assembly; and FIG. 3 illustrates the electric circuit of the exposure control assembly shown in FIG. 2.

DESCRIPTION OF THE PREFERRED EMBODIMENTS

FIG. 1 illustrates a portion of a still camera provided with a built-in exposure control assembly having a diaphragm (not shown) which can be adjusted by way of a rotary ring-shaped selector 1 to furnish a desired aperture size. The selector 1 is coupled with a diaphragm setting and exposure time influencing ring 6 by means of a yieldable elastic coupling here shown as a helical spring 5. One end of this spring is attached to a post 5a of the selector 1 and its other end is attached to a post 6A on a radial arm of the ring 6. The ring 6 is coaxial with the selector 1 and is further provided with a second radial arm or projection 7 which normally bears against an abutment 8 on the selector under the action of the coupling spring 5. It will be seen that all angular movements of the selector 1 are shared by the setting ring 6.

The periphery of the selector 1 is provided with a ring gear 1a which meshes with a reciprocable toothed rack 2 forming part of a first indicating device having an index 3 movable along the graduations of a fixed *f*-scale 4 which is observable by looking through the viewfinder window 15 of the camera. The setting ring 6 is provided with a gear **6*b* which meshes with a toothed rack 9 forming part of a regulating device having a grey filter 10 which influences the exposure time by being movable between a photosensitive receiver 11 and incoming scene light. The receiver 11 is mounted in the input portion of an electronic exposure time selecting circuit 12 which automatically adjusts the shutter in dependency on two parameters, namely, the intensity of scene light as measured by its receiver 11 and the angular position of the adjusting ring 6 (selected aperture size) which controls the position of the regulating filter 10 with reference to the receiver 11. The output of the exposure time selecting circuit 12 is connected with two indicating devices here shown as electric lamps 13 and 14. At least one of these lamps serves to indicate that exposure time or that group of exposure times which are too long for the making of exposures with the camera held by hand, i.e., which is long enough to warrant the mounting of the camera on a tripod or another suitable stationary support. The arrangement is assumed to be such that the lamp 13 is designed to produce a red signal and that the lamp 14 is designed to produce an indication which is a white signal, when the circuit 12 selects one of a predetermined group of (relatively long) exposure times which warrant the use of a tripod. Thus, when the receiver 11 and the regulating filter 10 cause the circuit 12 to select an exposure time of one-thirtieth second or longer, the lamps 13, 14** can light up to respectively furnish indications in the form of a red and a white signal.

If it is desired to know the exposure time which is selected by the control circuit 12 in response to manual selection of a desired aperture size, i.e., that exposure time which corresponds to the aperture size pinpointed on the f-stop scale 4 by the index 3 of the first indicating device which includes the reciprocable rack 2, the procedure is as follows: The user depresses a rotary overriding or displacing member 16 a portion of which is accessible from without the camera housing and which is reciprocable under and against finger pressure in directions indicated by the arrow 16A. A spring or the like (not shown) urges the overriding member 16 in an upward direction, as viewed in FIG. 1. The periphery of the member 16 forms a gear 16B which, when the member 16 is depressed to assume the position 16a (indicated by broken lines), meshes with a gear *6a* on the periphery of the setting ring 6. Thus, when the user rotates the setting ring 6 with reference to the selector 1 in response to anticlockwise rotation of the overriding member 16, the ring 6 then rotates in a clockwise direction so as to move the projection 7 away from the abutment 8. The selector 1 is held in the previously selected angular position by a suitable detent device D of any known design. Of course, the rack 9 is moved lengthwise in response to each angular displacement of the setting ring 6 so that the overriding member 16 can change the position of the regulating filter 10 with reference to the receiver 11. In order to rotate the selector 1, the user of the camera must overcome the resistance of the detent device D which is strong enough to hold the selector 1 against rotation when the depressed overriding member 16 rotates the ring 6 to stress the spring 5.

The overriding member 16 is provided with a second gear 17 which is concentric with the gear 16B and moves into mesh with a toothed rack 18 when it assumes the position **17*a* (namely, when the overriding member 16 is depressed to assume the position 16*a*). The rack 18 is biased in a direction to the left, as viewed in FIG. 1, by a helical return spring 24 and constitutes a carrier for an exposure time scale 20. When the spring 24 is permitted to contract, the carrier 18 abuts against two stationary stop pins 19 in the housing of the camera. The exposure time scale 20 is movable along the scale 4 and is observable by looking into the window 15 of the viewfinder. The carrier 18 further supports an opaque shield or mask 23 which overlies and conceals the lamp 13 when the gear 17 is rotated in a direction (counterclockwise) to move the carrier 18 to the right, as viewed in FIG. 1. The mask 23 can constitute an integral extension of the exposure time scale 20**.

The lamp 14 lights up and thus produces an indication when the overriding or displacing member 16 moves the regulating filter 10 to a predetermined position with reference to the receiver 11, and the lamp 14 then enables the user to read on the scale 20 that exposure time which corresponds to the manually selected aperture size. The user then relaxes the finger pressure against the overriding member 16 so that the latter is free to return to the solid-line position of FIG. 1 and permits the spring 24 to return the carrier 18 into abutment with the stop pins 19. At the same time, the spring 5 returns the projection 7 of the setting ring 6 into engagement with the abutment 8 of the selector 1 which is held against rotation by the detent device D. As the setting ring 6 rotates under the action of the coupling spring 5, the regulating filter 10 returns to the position which was determined by the selector 1.

The camera can be provided with a translucent auxiliary indicator in the form of a foil or sheet having sections 21 and 22 located behind the reciprocable exposure time scale 20. The section 21 can be tinted in green color and the section 22 can be tinted in red. When the lamp 14 lights up at a time when the exposure time scale 20 maintains its graduation "1/30 sec." and hence the section 22 in front of the lamp 14, the latter illuminates this graduation in red so that the user of the camera is warned that the exposure time is too long for the making of exposures with the camera held by hand. When the scale 20 maintains in registry with the lamp 14 a graduation which indicates a relatively short exposure time (e.g., an exposure time between one-sixtieth and one five-hundredth sec.), the registering graduation is illuminated in green because the graduations indicating the shorter exposure times are applied to the scale 20 in front of the green section 21. The sections 21, 22 share the reciprocatory movements of the scale 20.

The signal which is produced by the red lamp 13 is considered a warning signal because it indicates to the user of the camera that a proper exposure can be made only if the camera housing is mounted on a tripod or the like. The white lamp 14 serves as a reading lamp, i.e., it illuminates those graduations of the scales 4 and 20 which are representative of the selected or unsatisfactory exposure values. Therefore, when the user of the camera need not be warned that the selected exposure time is too long for the making of exposures with the camera housing held by hand, the red lamp 13 is concealed behind the mask 23 and the white lamp 14 can light up to illuminate the adjacent portion of the scale 20 and/or 4. Such situation arises when the user merely wishes to determine that exposure time which is set as a function of the scene brightness and as a function of the selected aperture size. During such determination, completion of the circuit of the red lamp 13 would be of no value since the user can read the automatically selected exposure time and is in a position to judge whether or not the indicated exposure time is satisfactory for a particular exposure.

When the regulating filter 10 is moved in response to rotation of the overriding or displacing member 16 (in the position **16*a*), its effect upon the circuit 12 is the same as if the user were to change the sensitivity of the receiver 11. Such simulated regulation of sensitivity of the receiver 11 is continued until the condition of the circuit 12 corresponds to that when the intensity of scene light is unsatisfactory for an exposure, i.e., when the exposure time is too long for the making of exposures with the camera housing held by hand. Therefore, the circuits of the lamps 13, 14 are completed. The movements of the regulating filter 10 under the action of the overriding member 16 are synchronized with the movements of the carrier 18 in such a way that the graduation indicating the exposure time selected by the selector 1 and depending on the prevailing scene brightness registers with the f-stop graduation which is pinpointed by the index 3 on the rack 2. The latter remains at a standstill when the overriding member 16 displaces the filter 10 and the scale 20 because its teeth mesh with the teeth of the gear 1a on the selector 1** which is held against rotation by the detent device D.

In FIG. 1, the rotation of the setting ring 6 from its normal or starting position causes the diaphragm to reduce the aperture size (i.e., the index 3 moves in a direction to the right). The lamps 13, 14 light up when the aperture size is reduced to a particular value which is too small for the prevailing scene brightness. It is also possible to design the exposure control assembly in such a way that the setting ring 6 normally causes the diaphragm to define an aperture of minimum size at which the lamps 13, 14 produce visible signals. The circuits of the lamps open when the ring 6 adjusts the diaphragm to furnish the smallest aperture size which is satisfactory for exposures at the prevailing scene brightness. The graduations of the scale 4 register with appropriate graduations of the scale 20 when the lamp 14 furnishes an indication, either by beginning to emit a visible signal or by terminating the emission of a visible signal.

In accordance with a second embodiment of the invention, the camera of FIG. 1 can be modified as follows: The exposure time scale 20 is secured to the rack 2 and consists of transparent (light-transmitting) material. The space between the lamp 14 and the transparent exposure time scale accommodates an optical system (e.g., a light conducting bar) which illuminates the exposure time scale (so that it can be seen by the user) only when the lamp 14 lights up to furnish an indication in response to selection of an exposure time whose length is less than a predetermined length. In such positions of the rack 2 and the transparent exposure time scale thereon, the graduations of the exposure time scale register with corresponding graduations (f-stops) on the scale 4. Thus, the user can determine that one of the various exposure times which will be selected if the user decides to select a particular aperture size. For example, if the index 3 of the rack 2 pinpoints a particular *f*-stop (e.g., "8"), that graduation on the exposure time scale which registers with the selected *f*-stop when the lamp 14 lights up indicates the exposure time which will be selected by the circuit 12 if the exposure will be made with the selected f-stop. The user can select any desired *f*-stop if the lamp 13 and/or 14 does not light up while the rack 2 moves the transparent exposure time scale all the way between its two end positions. Each exposure will be satisfactory but the user will be unable to determine the exposure times which correspond to selected aperture sizes. However, if the user wishes to select a particular exposure time, the selector 1 is rotated until the lamp 13 and/or 14 lights up. The lamp 13 and/or 14 then illuminates the transparent exposure time scale and the user sees that the desired exposure time (e.g., one one hundred twenty-fifth sec.) registers with a particular *f*-stop (e.g., "16") on the scale 4. By thereupon rotating the selector 1 so as to move the index 3 into registry with the *f*-stop "16", the user knows that the exposure time will be one one hundred twenty-fifth sec. In this way, the user can select in advance that exposure time which is considered to be best suited for a particular exposure time. In other words, the exposures can be made by selecting the aperture size without regard to the exposure time (which is selected automatically in dependency on the aforediscussed parameters), or by selecting that aperture size which corresponds to a desired exposure time.

FIGS. 2 and 3 illustrate a portion of another still camera which comprises a housing H provided with a cutout for a portion of a rotary setting ring 120 having a first gear 120*a* meshing with a gear 123 and a second gear 121 meshing with a displacing rack 122 carrying a pointer or indicating means 101. When the setting ring 120 is rotated in a counterclockwise direction, the rack 122 moves the pointer 101 in a direction to the left, as viewed in FIG. 2. The pointer 101 (or the rack 122) has two motion transmitting projections or arms 101*a*, 101*b* which can respectively pivot the armature 134 of an electromagnet 105 and an arresting lever 104. The armature 134 has a pallet or tooth 136 which can engage a tooth 133 on the arresting lever 104. A spring 132 biases the arresting lever 104 in a clockwise direction, as viewed in FIG. 2, toward engagement of a tooth 104*a* with the serrations or teeth 114 on an exposure time scale 112 which is biased to a starting position against a suitable stop (not shown) by a helical return spring 114*a* . The armature 134 is a two-armed lever which is biased in a clockwise direction by a helical spring 135. The spring 114*a* urges a post 103 on the exposure time scale 112 against the pointer 101. When the electromagnet 105 is energized, it maintains the armature 134 in the illustrated position to stress the spring 135. When the electromagnet 105 is deenergized by the adjustable exposure time selecting circuit shown in FIG. 3 while the setting ring 120 rotates to move the rack 122 in a direction to the left, as viewed in FIG. 2, the tooth 104a of the arresting lever 104 is free to engage the adjacent teeth 114 on the exposure time scale 112 under the action of the spring 132. The tooth 136 is then disengaged from the tooth 133. The scale 112 is held against further movement under the action of the spring 114*a*, i.e., the pointer 101 can move away from the post 103.

If the user thereupon depresses a release element 130 which is biased to the illustrated starting position by a helical spring 131, a cam 129 on the release element 130 shifts a pusher 127 which is reciprocable in stationary bearings and abuts against an arm 137 of the armature 134. The pusher 127 then returns the armature 134 to the illustrated position whereby the arm 137 extends into the path of movement of a rotary shutter closing ring 126. The arm 137 moves away from the path of the ring 126 to permit closing of the shutter S only when the electromagnet 105 is deenergized so that the spring 135 is free to pivot the armature 134 in a counterclockwise direction.

The pointer 101 is returned to its normal position upon completion of the exposure, preferably by the film transporting mechanism which includes the aforementioned gear 123 meshing with the gear 120*a* of the setting ring 120. The film transporting mechanism further includes a gear 125 having a notch or recess 125*a* which faces a notch or recess 124*a* in a gear 124 when the film transporting mechanism is idle. The gear 124 is fixed to the gear 123. When the gear 125 rotates while the film transporting mechanism advances the film (not shown) by the length of a frame upon completion of an exposure, the gear 125 rotates the gears 124, 123 whereby the gear 123 moves the gear 120*a* so that the gear 121 returns the pointer 101 to its normal or starting position in which the setting ring 120 selects the smallest aperture size (e.g., "64"). If the user decided not to make an exposure subsequent to movement of the setting ring 120 from its normal position, the setting ring can be rotated by hand in a clockwise direction to return the pointer 101 to its starting position prior to depression of the release element 130.

If the user is to select a desired aperture size or exposure time, it is advisable that the user determine those exposure times which should be selected in response to selection of desired aperture sizes, or vice versa. For example, if the user wishes to make an exposure with a particular exposure time, e.g., one one hundred twenty-fifth sec., the mechanism shown in FIG. 2 can be manipulated to indicate to the user that aperture size which is best suited for an exposure with the exposure time of one one hundred twenty-fifth sec. at the prevailing scene brightness. To this end, the pointer 101 is coupled with a regulating device here shown as a grey filter 102 which can be moved between the incoming scene light (arrows 200) and a photosensitive receiver 106 of the exposure time selecting circuit in response to movement of the pointer 101 with the displacing rack 122. The diaphragm is adjusted in response to rotation of the setting ring 120. When the ring 120 is rotated through a small angle so as to move the rack 122 and the pointer 101 through a small distance in a direction to the left, as viewed in FIG. 2, the diaphragm furnishes an aperture size, e.g., "64," which is smaller than the smallest size indicated on an *f*-stop scale 140. The lamp 109 lights up and the circuit of FIG. 3 energizes the electromagnet 105 which serves to hold the shutter in open position for the selected period of time. The energized electromagnet 105 then causes the armature 134 to hold the arresting lever 104 in the illustrated position in which the tooth 104*a* is disengaged from the teeth 114 of the exposure time scale 112. If the pointer 101 is caused to continue its leftward movement, the exposure time scale 112 becomes visible in the viewfinder window of the camera. This exposure time scale 112 is movable adjacent to (below, as viewed in FIG. 2) the stationary *f*-stop scale 140 which is also observable in the viewfinder window. For example, a mirror (not shown) can reflect the image of the scale 140 into the viewfinder. As the user continues to rotate the setting ring 120 in a counterclockwise direction, the lamp 109 is turned off in a predetermined position of the pointer 101 whereby the electromagnet 105 becomes deenergized simultaneously with opening of the circuit of the lamp 109 and the arresting lever 104 engages and holds the exposure time scale 112. The circuit of FIG. 3 for the lamp 109 and electromagnet 105 is described in detail in German printed publication No. 1,285,295.

The arresting member 104 holds the exposure time scale 112 in a position in which the graduations indicating various exposure times register with those graduations of the *f*-stop scale 140 which indicate the corresponding aperture sizes for the prevailing scene brightness. The user then selects a particular aperture size by rotating the setting ring 120 until the pointer 101 registers with the graduation indicating the desired aperture size. This insures that, when the release element 130 is depressed, the camera will make an exposure with the particular aperture size and with the corresponding exposure time.

The exposure time scale 112 carries red and black flags 113, 115 which extend to the *f*-stop scale 140. The flag 115 indicates to the user that range of exposure times (e.g., one-thirtieth sec. or longer) which are not suited for the making of exposures with the camera housing H held by hand and the flag 113 indicates those exposure times (e.g., one five-hundredth sec. or shorter) which are too short for making an exposure at the prevailing scene brightness. Since the regulating filter 102 shares the movements of the pointer 101, the exposure time is automatically influenced by the selection of the aperture size (by the setting ring 120) so that the exposure time will be a function of the selected aperture size and of the prevailing scene brightness. The receiver 106 is connected in the exposure time controlling circuit of the camera; this circuit deenergizes the electromagnet 105 upon expiration of the selected exposure time (following the opening of the shutter S) whereby the ring 126 closes the shutter to terminate the exposure. The electromagnet 105 is preferably designed in such a way that it is not energized in response to actuation of the film transporting mechanism but only in response to actuation of the release element 130 to be energized at the time when the shutter S opens.

In FIG. 2, the graduation indicating the aperture size "5.6" (on the f-stop scale 140) registers with the graduation "1/250" on the scale 112. This means that, if the pointer 101 is moved into registry with the graduation "5.6," the ring 120 will adjust the diaphragm to furnish an aperture size of 5.6 and the shutter S is set to furnish the exposure time of one two hundred fiftieth second. If the user dislikes such combination of exposure values, the pointer 101 can be moved to register with the graduation "8" whereby the shutter S is set to furnish the exposure time of one one hundred twenty-fifth second. The user can select any combination of exposure values on the visible portion of the scale 140 and on the adjacent portion of the scale 112.

The electromagnet 105 is deenergized when the arresting lever 104 engages the teeth 114 during rotation of the setting ring 120 and the proper exposure time is indicated on the scale 112. This electromagnet is energized again when the release element 130 is depressed and pivots the armature 134 independently of the position of the arresting lever 104 so that the armature holds the shutter closing ring 126 until after the elapse of the selected exposure time. Thus, the electromagnet 105 has two deenergized conditions including a first condition when the movement of the exposure time scale 112 is blocked by the arresting lever 104 and a second condition which arises when the ring 126 is to close the shutter S upon completion of an exposure.

FIGS. 2 and 3 show two switches 110, 111 which are actuated by the armature 134. The switch 110 closes when the switch 111 opens and vice versa. The switch 110 is closed when the electromagnet 105 is energized and when the motion transmitting projection 101a or the pusher 127 pivots the armature in an anticlockwise direction beyond the position shown in FIG. 2. The switch 111 can open or complete the circuit of the lamp 109.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. In a photographic apparatus, an exposure control assembly comprising a first scale having graduations representing aperture sizes; movable diaphragm setting means; first indicating means movable in response to movement of said setting means to pinpoint on said first scale that graduation which represents the aperture size selected by said setting means; an adjustable exposure time selecting circuit for selecting exposure times as a function of scene brightness; regulating means for adjusting said circuit as a function of the position of said setting means so that the exposure times selected by said circuit are influenced by aperture sizes which are selected by said setting means; second indicating means controlled by said circuit and operative to produce indications in response to selection of predetermined exposure times; third indicating means controlled by said circuit and operative to produce indications in response to selection of said predetermined exposure times; a second scale movable along said first scale and having graduations representing exposure times; window means positioned to permit the observation of at least a portion of each of said scales; displacing means for moving said regulating means in synchronism with said second scale so that said scales maintain in registry proper combinations of respective graduations when said regulating means causes said circuit to operate said second and third indicating means; opaque mask means arranged to conceal said third indicating means in predetermined positions of said second scale; and auxiliary indicating means associated with said second indicating means and operative to exert a different influence upon the indications furnished by said second indicating means in response to selection of relatively long and relatively short exposure times.

2. An assembly as defined in claim 1, wherein said circuit comprises photosensitive receiver means and said regulating means includes a device for adjusting said circuit by way of said receiver means.

3. An assembly as defined in claim 2, wherein said device is a grey filter.

4. An assembly as defined in claim 1, further comprising manually operated selector means for moving said setting means, said displacing means comprising means for moving said setting means, said second scale and said regulating means with reference to said selector means.

5. An assembly as defined in claim 4, further comprising yieldable coupling means normally connecting said setting means for movement with said selector means, said setting means being movable by said displacing means with reference to said selector means against the opposition of said coupling means.

6. An assembly as defined in claim 5, wherein said setting means and said selector means are rotatable about a common axis and each thereof comprises a gear, said first indicating means having a first rack meshing with the gear of said selector means and said regulating means having a second rack meshing with the gear of said setting means.

7. An assembly as defined in claim 1, wherein said exposure time selecting circuit is an electronic circuit.

8. An assembly as defined in claim 1, wherein said second scale consists of light-transmitting material and said second indicating means comprises a lamp which emits light in response to selection of said predetermined exposure times, and further comprising light conducting means for illuminating said second scale with light emitted by said lamp.

9. An assembly as defined in claim 1 wherein said diaphragm setting means is movable from a starting position corresponding to the smallest aperture size and further comprising film transporting means operative to transport the film by the length of a frame upon completion of an exposure and to thereby move said setting means to said starting position.

10. An assembly as defined in claim 1, further comprising arresting means for said second scale and means for actuating said arresting means in response to selection of said predetermined exposure times.

11. An assembly as defined in claim 1, wherein said regulating means is rigid with said first indicating means.

12. An assembly as defined in claim 11, wherein said circuit comprises switch means and said first indicating means comprises means for actuating said switch means in response to movement of said setting means.

13. An assembly as defined in claim 12, further comprising arresting means for said second scale and motion transmitting means provided on said first indicating means for actuating said arresting means.

14. In a photographic apparatus an exposure control assembly comprising a first scale having graduations representing aperture sizes; movable diaphragm setting means; first indicating means movable in response to movement of said setting means to pinpoint on said first scale that graduation which represents the aperture size selected by said setting means; an adjustable exposure time selecting circuit for selecting exposure times as a function of scene brightness; regulating means for adjusting said circuit as a function of the position of said setting means so that the exposure times selected by said circuit are influenced by aperture sizes which are selected by said setting means; second indicating means controlled by said circuit and operative to produce indications in response to selection of predetermined exposure times; a second scale movable along said first scale and having graduations representing exposure times; displacing means for moving said regulating means in synchronism with said second scale so that said scales maintain in registry proper combinations of respective graduations when said regulating means causes said circuit to operate said second indicating means; manually operated selector means for moving said setting means said displacing means comprising means for moving said setting means said second scale and said regulating means with reference to said selector means; and yieldable coupling means normally connecting said setting means for movement with said selector means, said setting means being movable by said displacing means with reference to said selector means against the opposition of said coupling means; said setting means and said selector means being rotatable about a common axis and each thereof comprising a gear, said first indicating means having a first rack meshing with the gear of said selector means and said regulating means having a second rack meshing with the gear of said setting means; said setting means further comprising a second gear and said displacing means comprising a rotary overriding member having two coaxial gears; said overriding member being movable from a first to a second position in which one of its gears meshes with the second gear of said setting means and said second scale having a rack meshing with the other gear of said overriding member in the second position of said overriding members.

* * * * *